Jan. 24, 1967 J. P. BELTZ 3,300,045

CHARACTER READER DOCUMENT SORTER

Filed Dec. 23, 1963 2 Sheets-Sheet 1

INVENTOR.
JOHN P. BELTZ

BY John V. Regan

ATTORNEY

Jan. 24, 1967 J. P. BELTZ 3,300,045

CHARACTER READER DOCUMENT SORTER

Filed Dec. 23, 1963 2 Sheets-Sheet 2

INVENTOR.
JOHN P. BELTZ
BY John V. Regan
ATTORNEY

United States Patent Office 3,300,045
Patented Jan. 24, 1967

3,300,045

CHARACTER READER DOCUMENT SORTER

John P. Beltz, Willingboro, N.J., assignor to Radio Corporation of America, a corporation of Delaware Filed Dec. 23, 1963, Ser. No. 332,499
5 Claims. (Cl. 209—111.7)

Figure 1:
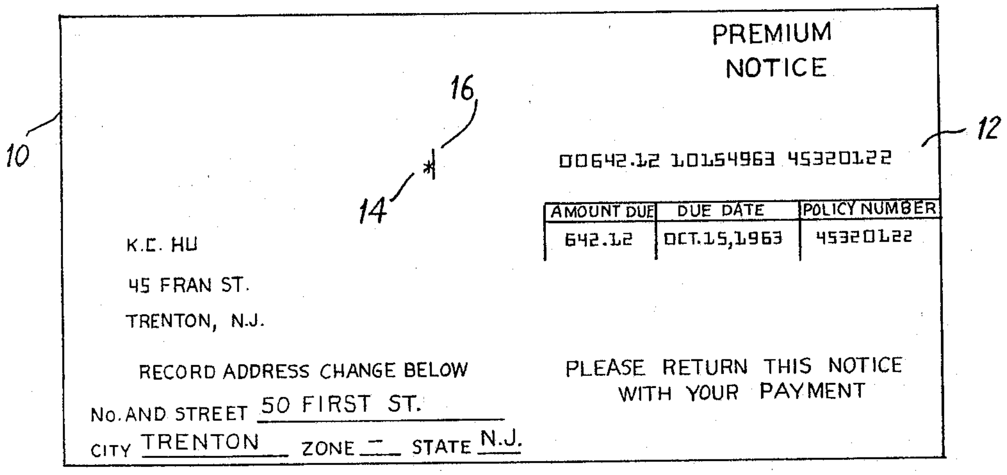

This invention relates to optical character readers, and more particularly to methods and circuits for utilizing such character readers to sort printed documents.

Certain optical character readers electro-optically scan characters printed on a document and recognize the characters by the distinctive sets of video signals produced when different characters are scanned. The term "character" is utilized throughout the specification to denote alphabetic, numeric, and other symbols which are printed on a document by printing apparatus. The documents being read may, for example, comprise turn-around documents, i.e., documents printed by a computer-operated printer and subsequently returned to be read by the character reader so as to provide an input to the computer.

It is frequently necessary to sort turn-around documents into different groups so that changes of address or other changes may be made on selected documents. To increase the flexibility and usefulness of the character reader, it is desirable that the character reader be able to sort the printed documents without using separate sorters to do the sorting.

Accordingly, it is an object of this invention to provide a character reader which is capable of sorting as well as reading printed documents.

It is another object of this invention to provide a new and improved method of sorting printed documents.

In accordance with the invention, printed documents, on which are preprinted selected control indicia, are sorted by a character reader. A mark is made over the control indicia on those documents to be sorted from the entire group of documents. The mark may be made by a pen, a pencil, or the like, and renders the control indicia unrecognizable by the character reader. Both the marked and unmarked documents are passed through to be read by the character reader and the documents are separated (sorted) by detecting the control indicia on the unmarked documents and the absence of the control indicia on the marked documents.

Figure 2:
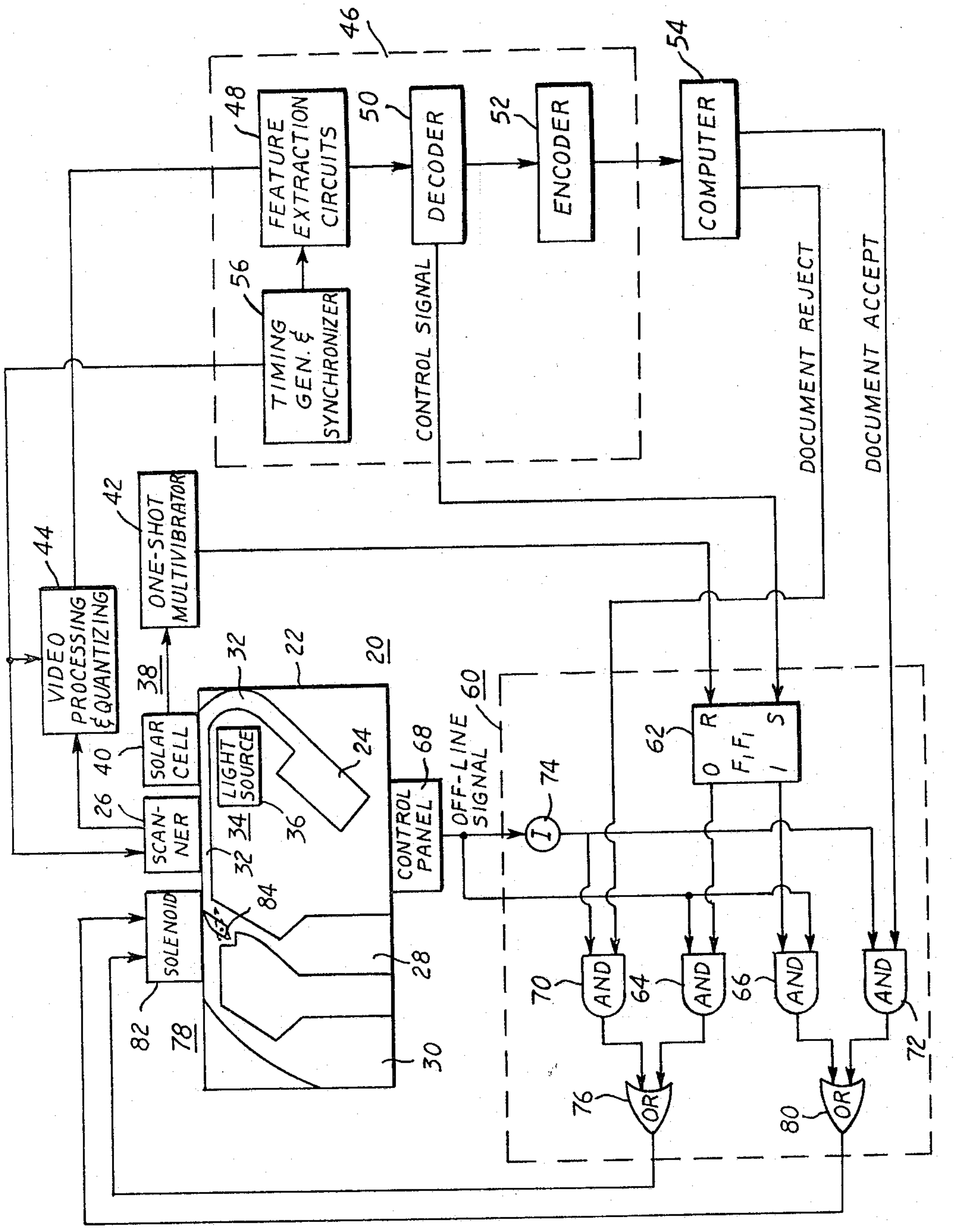

In the drawings:

FIGURE 1 is an illustration of a document including control indicia preprinted thereon; and FIGURE 2 is a schematic block diagram of a character reading system embodying the invention.

Referring now to FIGURE 1, there is illustrated a printed document 10 which may be sorted by a character reading system embodying the invention. The document 10 is illustrated as a premium notice which is mailed by an insurer to an insured to notify him that a premium payment is due. The information printed on the document 10, which is in addition to the normal blank stock printed matter, may be printed by a computer operated high-speed printer and includes the name and address of the insured. Additionally, the policy number, the premium due date, and the premium amount are printed from right-to-left on a single line 12 of the document 10. The information printed on the single line 12 may be the total amount of information to be read by the character reader, inasmuch as the policy number identifies the insured. Also printed on the single line 12 is control indicia 14. The control indicia 14 is shown as an asterisk although, as will be apparent, any other individual character or sequence of characters may be utilized. A handwritten mark 16 is marked over the asterisk 14. Such a mark may, for example, be made by a clerk utilizing a pen, a pencil, or the like, when the document is returned to the insurer and denotes that this particular document is one of a group that is to be sorted out from the remainder of the documents. The particular reason that this document should be sorted may, for example, be because an address change appears on this document.

The handwritten mark 16 may be of any form so long as the asterisk is rendered unrecognizable by the character reader. Thus, the mark may also comprise any one of the following; a circle enclosing the asterisk, a straight line drawn adjacent the top or bottom of the asterisk, a plurality of lines crossing out the asterisk, etc. Thus, documents to be stored are handmarked to render the control indicia 14 unrecognizable.

Referring now to FIGURE 2, a schematic block diagram of a character reading system 20 according to the present invention is shown. The character reading system 20 includes a document transport 22 which is shown in plan view and in outline schematic form. The document transport 22 transports documents to be read from an input hopper 24 past a scanner 26 and stacks the documents in a plurality of output pockets or stackers 28 and 30. The document transport 22 may, for example, comprise a Pitney-Bowes document transport Model 9031.

The printed documents to be read are stacked edgewise in the input hopper 24. The documents are extracted one-by-one and transported edgewise along a document feed track 32 by a feed mechanism (not shown). The documents are transported past a document presence sensing circuit 34 which includes a light source 36 mounted on one side of the feed track 32 and a document sensor 38 mounted on the other side of the feed track 32. The document sensor 38 may, for example, include a solar cell 40 serially connected to a one-shot multivibrator 42. When the leading edge of each consecutive document interrupts the transmission of light from the light source 36 to the solar cell 40, a decreasing step in the output current of the solar cell 40 is produced. The decreasing current step activates the one-shot multivibrator 42 to generate a pulse denoting that the leading edge of a document has been detected.

The scanner 26 is mounted on the document transport 22 along the feed track 32 between the output stackers and the document sensor 38. The scanner 26 is positioned to scan the characters printed on line 12 of the document 10 in FIGURE 1. The scanner 26 may, for example, comprise a photoconductive tube system such as a vidicon tube system. The scanning beam of the scanner 26 is repeatedly deflected from top to bottom in a single line vertical scanning. The single line electronic scanning along with the horizontal motion of the document 10 causes each character on a document to be successively imaged onto the scanner 26 and scanned by a plurality of scanlines in an orthogonal scanning raster. The scanner 26 generates an output pulse each time the outline trace of a character is intercepted by the scanning beam thereof. The video signals generated by the scanner 26 include a plurality of feature signals which serially represent the features of a character, i.e., the vertical and horizontal stroke features, etc. appearing in the outline trace of the character. The features of any particular character are different from the features of any other character and to emphasize the differences stylized fonts may be designed to emphasize these differences and make recognition easier.

The video signals generated by the scanner 26 are applied to a video processing and quantizing circuit 44. The circuit 44 processes the raw video signals which are analog in form so as to produce quantized video signals having pulses of a desired uniform amplitude with fast rise and fall times. The scanner 26 and the video processing circuit 44 may, for example, comprise a scanning system of the type described in a copending application for Seymour Klein, entitled "Optical Scanning System for Character Reader," Serial No. 237,949, filed November 15, 1962, and assigned to the same assignee as that of the present invention.

The quantized video signals are applied to a character recognition system 46. The character recognition system 46 may, for example, be of the type described in a copending application for Klein et al., entitled "Character Reader," Serial No. 253,911, filed January 25, 1963, and assigned to the same assignee as the present invention. The character recognition system 46 includes feature extraction circuits 48 which detect and extract from the quantized video signals the various feature signals contained therein. The various feature signals are stored in different storage devices pending the completion of the scanning of an entire character. At the end of scanning a character, the various feature signals are applied to a decoder 50 which synthesizes the feature signals to produce a signal denoting a particular character when the character is recognized from the feature signals. The decoder 50 produces a reject signal when the various feature signals cannot be synthesized into a recognizable character. Finally, the decoder 50 also produces a control signal when the control indicia 14 preprinted on a document is recognized. The signals representing both a recognized character and a reject character are applied to an encoder 52 which encodes the output signals from the decoder 50 into a binary coded form so as to provide an input for a computer 54 connected thereto. The scanning of a character and the flow of the feature signals through the character recognition system 46 are synchronized under the control of a timing generator and synchronizer 56.

A document sorting circuit 60 is included in the character reading system 20 to control the flow of the documents 10 into either an accept output stacker 28 or a reject output stacker 30. The document sorting circuit 60 functions either off-line, i.e., when the computer is not connected to the character reading system 20, or on-line. The sorting circuit 60 includes a flip-flop 62 having an input reset terminal (R) connected to the one-shot multivibrator 42 in the document sensing circuit 38 and an input set (S) terminal connected to receive a control signal from the decoder 50 in the character recognition system 46. Thus, the flip-flop 62 is initially reset when the leading edge of a document is detected and is not set unless control indicia 15 is recognized on the document. The flip-flop 62 generates a recognition sigal from the "1" output terminal thereof and a nonrecognition signal from the "0" output terminal thereof. The "0" and "1" output terminals of the flip-flop 62 are coupled to provide one input to a pair of AND gates 64 and 66, respectively. The other input to each of the AND gates 64 and 66 comprise an off-line signal level derived from a control panel 68 on the document transport 22. Thus, when the document transport 22 is operated off-line, each of the AND gates 64 and 66 is enabled and one of these gates is activated by the set or reset condition of the flip-flop 62.

The sorting circuit 60 also includes a pair of on-line AND gates 70 and 72. One input to each of the AND gates 70 and 72 is derived from an inverter 74 connected to invert the off-line signal derived from the control panel 68. Thus, the gates 70 and 72 are enabled in the absence of an off-line signal, which in effect denotes on-line operation. The second input to the AND gate 70 comprises a document reject signal from the computer 54 denoting that the document being read should be re-run. The second input to the AND gate 72 comprises a document accept signal from the computer 54 denoting that the document has been read acceptably. The output of each of the reject AND gates 64 and 70 is coupled through an OR gate 76 to apply a reject signal to an electromagnetically-operated gate 78 on the document transport 22. Similarly, the output of each of the accept AND gates 66 and 72 is coupled through an OR gate 80 to apply an accept signal to the gate 78.

The gate 78 controls the flow of documents from the feed track 32 into the accept stacker 28 and the reject stacker 30. The electromagnetic gate 78 comprises a solenoid 82 connected to operate a deflector 84. The deflector 84 is pivotably mounted on the document transport 22 to operate between a first position and a second position under the control of the solenoid 82. The first operating position of the deflector 84 is shown in solid form on FIGURE 2 and connects the feed track 32 to the accept pocket 28. The second operating position of the deflector 84 is shown in dotted form on FIGURE 2 and connects the reject pocket 30 to the feed track 32 while blocking the accept pocket 28.

When operating the character reading system 20 and the computer 54 on-line, the AND gates 70 and 72 are enabled by the output from the inverter 74 while the AND gates 64 and 66 are disabled by the absence of an off-line signal from the control panel 68. Documents such as the document 10 in FIGURE 1 are inserted in the input hopper 24 of the document transport 22 to be read by the character reading system 20. Some of these documents may have the control indicia 14 marked over while others may not. However, in on-line operation the computer 54 is programmed to ignore the presence or absence of the control indicia 14. Thus, the documents are consecutively scanned by the scanner 26 and signals denoting recognized or reject characters continuously flow into the computer 54. If for one reason or another, the computer 54 does not receive enough information from the character reading system 20 on a particular document, a document reject signal is transmitted through the gates 70 and 76 to cause deflector 84 to operate in the second operating position thereof so that the document enters the reject pocket 30. For documents which are satisfactory to the computer, a document accept signal is transmitted to the gate 78 to cause the deflector 84 to operate in its first position and transmit these documents to the accept pocket 28. Thus, the control indicia 14 plays no part in the operation of the character reader-computer combination when the combination is operated on-line.

In off-line operation, an off-line signal from the control panel 68 of the document transport 22 enables the AND gates 64 and 66 while disabling the gates 70 and 72. During off-line operation, the computer 54 may, for example, be utilized to further process the information data fed into it during on-line operation. In off-line operation, the leading edge of each document activates the document sensing circuit 34 to produce an output pulse from the multivibrator 42 to reset the flip-flop 62 in the document sensing circuit 60. The document then is conveyed along the feed track 32 to have the information printed thereon scanned by the scanner 26. All of the information on line 12 of the document 10 in FIGURE 1 is scanned. However, the only signal from the decoder 50 which is utilized in off-line operation is a control signal which indicates that the control indicia 14 has been recognized. If the control indicia on a document is recognized, the flip-flop 62 is set and the AND gate 66 activated to produce an accept signal. The accept signal causes the gate 78 to steer the document into the accent pocket 28. If the control indicia 14 is marked over to render it unrecognizable, no control signal is produced by the decoder 50. Consequently, the flip-flop 62 remains reset for this document and the AND gate 64 is activated to produce a reject signal. The reject signal causes the gate 78 to steer the document into the reject pocket 30. Thus, depending on whether or not the control indicia 14 on a document is recognized, the documents will be sorted into two groups.

The ability of a character reader to sort documents in the manner described greatly enhances the flexibility and utility of a character reader. The method is simple and inexpensive and does not require complex and expensive equipment to provide the control indicia, as is required with punched cards, and the like. Furthermore, the simple technique of hand marking over the preprinted control indicia takes less time than machine marking the documents and avoids the insertion and withdrawal of a document into and from a machine.

It is apparent that the character reading system 20 may be modified to provide on-line sorting of the documents merely by providing another electromagnetic gate and another output pocket on the document transport. With such a modified transport, the documents are first accepted or rejected by the computer 54 and the documents flowing into the accept pocket would then be gated again into two groups depending upon the recognition of the control indicia 14.

It is also apparent that the location of the control indicia 14 in any particular portion of the line 12 on the document 10 is immaterial. The control indicia need not be the last data of information read by the character reader as has been described.

Thus, in accordance with the invention, a character reader which both reads and sorts printed documents is provided. The sorting technique requires no special sorting equipment, other than the character reading system 20 itself. The ability to sort as well as read printed documents increases the flexibility and usefulness of the character reader.

What is claimed is:

1. A character reader for reading characters printed on documents, the characters on all of said documents including printed control indicia, comprising in combination, a scanner for scanning the characters printed on said documents to derive character feature signals and control indicia signals, said documents including certain ones having said control indicia marked so as to render said control indicia unrecognizable by said character reader, character recognition means coupled to said scanner for generating a recognition signal when said control indicia is recognized on a document and a nonrecognition signal when said control indicia is unrecognizable, and means for directing a document along a first path when said recognition signal is generated and along another path when said nonrecognition signal is generated, whereby printed documents may be sorted by rendering the control indicia on selected documents unrecognizable.

2. A character reader for reading characters printed on a document, the characters on all of said documents including printed control indicia, comprising in combination, a transport mechanism for successively conveying said documents from an input feed station to a plurality of output stations, said documents including selected ones having said control indicia marked so as to render said control indicia unrecognizable by said character reader, a scanner mounted on said transport mechanism intermediate of said input and output stations for scanning the characters printed on said document to derive character feature signals and control indicia signals, character recognition means coupled to said scanner for generating a recognition signal when said control indicia is recognized on a document and a nonrecognition signal when said control indicia is unrecognizable, and gate means mounted on said document transport for directing into a first output receive station documents for which a recognition signal is generated and into a second output receive station documents for which a nonrecognition signal is generated, whereby the printed documents are sorted into two groups by rendering the control indicia on selected documents unrecognizable.

3. The method of sorting printed documents by a character reader comprising the steps of, preprinting control indicia on all of said documents, marking over the control indicia on certain documents so as to render the control indicia unrecognizable by said character reader, passing both marked and unmarked documents through said character reader, and separating the marked documents from the unmarked documents by recognizing the control indicia on the unmarked documents.

4. The method of sorting printed documents by a character reader comprising the steps of, preprinting control indicia on all of said documents, hand marking over the control indicia on certain documents so as to render the control indicia unrecognizable by said character reader, passing both marked and unmarked documents through said character reader, and separating the marked documents from the unmarked documents by recognizing the control indicia on the unmarked documents.

5. The method of sorting printed documents by a character reader comprising the steps of, preprinting control indicia on all of said documents, rendering the control indicia on certain documents unrecognizable by said character reader by marking over said control indicia, passing both marked and unmarked documents through said character reader, generating a control signal when a control indicia is recognized on a document, and utilizing said control signal to steer said unmarked documents to a different location than said marked documents.

References Cited by the Examiner

UNITED STATES PATENTS

| | | | |
|---|---|---|---|
| 2,781,971 | 2/1957 | Knutsen | 235—61.7 |
| 3,023,399 | 2/1962 | Dickinson | 235—61.7 |

FOREIGN PATENTS

| | | |
|---|---|---|
| 1,114,349 | 9/1961 | Germany. |

References Cited by the Applicant

FOREIGN PATENTS

| | | |
|---|---|---|
| 882,012 | 7/1953 | Germany. |
| 174,631 | 3/1961 | Sweden. |

MAYNARD R. WILBUR, *Primary Examiner.*

D. W. COOK, *Assistant Examiner.*